(12) United States Patent
Choi (10) Patent No.: US 10,318,504 B2
(45) Date of Patent: Jun. 11, 2019

(54) APPARATUS AND METHOD FOR PROCESSING MAP DATA BY REAL-TIME INDEX CREATION AND SYSTEM THEREOF

(71) Applicant: Thinkware Systems Corporation, Seongnam-si, Gyeonggi-do (KR)

(72) Inventor: Won Kyung Choi, Seoul (KR)

(73) Assignee: Thinkware Systems Corporation, Seongnam-si (KR)

( * ) Notice: Subject to any disclaimer, the term of this patent is extended or adjusted under 35 U.S.C. 154(b) by 303 days.

(21) Appl. No.: 14/508,491

(22) Filed: Oct. 7, 2014

(65) Prior Publication Data

US 2015/0120751 A1    Apr. 30, 2015

(30) Foreign Application Priority Data

Oct. 29, 2013 (KR) .................. 10-2013-0129118

(51) Int. Cl.
*G06F 16/22* (2019.01)
*G06F 16/29* (2019.01)
*G06F 16/245* (2019.01)

(52) U.S. Cl.
CPC ............ *G06F 16/22* (2019.01); *G06F 16/245* (2019.01); *G06F 16/29* (2019.01)

(58) Field of Classification Search
USPC ................... 701/532, 409; 707/921
See application file for complete search history.

(56) References Cited

U.S. PATENT DOCUMENTS

| 2004/0117358 | A1* | 6/2004 | von Kaenel | ...... G06F 17/30241 |
| 2007/0276845 | A1* | 11/2007 | Geilich | ............ G06F 17/30241 |
| 2009/0132469 | A1* | 5/2009 | White | ................... G06Q 10/00 |

FOREIGN PATENT DOCUMENTS

| CN | 101432687 | 5/2009 |
| CN | 102033947 | 4/2011 |
| KR | 10-0219161 B1 | 6/1999 |

OTHER PUBLICATIONS

Office Action for Chinese Patent Application No. CN 201410583601.X, dated Jul. 5, 2017, 20 Pages, (with English Translation).
Office Action for Chinese Patent Application No. CN 201410583601.X, dated Apr. 4, 2018, 13 Pages, (with Concise Explanation of Relevance).

* cited by examiner

*Primary Examiner* — Kenneth M Lo
*Assistant Examiner* — Istiaque Ahmed
(74) *Attorney, Agent, or Firm* — Fenwick & West LLP (57) ABSTRACT

Disclosed is a system and method capable of minimizing user-set search data and local filtering data by creating index data in real time. A search data processing system includes an index generation unit adapted to generate index data for a search on map-associated data of an item selected by a user; and a search execution unit adapted to execute a search operation on the map-associated data of the selected item by means of the index data.

11 Claims, 7 Drawing Sheets

Area A: Remaining area of administrative zone 1 other than area C
Area B: Remaining area of the administrative zone 2 other than area D
Area C: Intersection area, intersecting with administrative zone 1, from among semantic zone 1
Area D: Intersection area, intersecting with administrative zone 2, from among semantic zone 1

APPARATUS AND METHOD FOR PROCESSING MAP DATA BY REAL-TIME INDEX CREATION AND SYSTEM THEREOF

CROSS-REFERENCE TO RELATED APPLICATIONS

A claim for priority under 35 U.S.C. § 119 is made to Korean Patent Application No. 10-2013-0129118 filed Oct. 29, 2013, in the Korean Intellectual Property Office, the entire contents of which are hereby incorporated by reference.

BACKGROUND

The embodiments herein relate to a system of processing search data for searching a map and a method thereof.

With the advent of the Internet age, the importance of search has been more highlighted than ever. A number of companies try to improve the performance and functions of the search, and a lot of effort has been also made in the navigation field.

For example, the KP No. 10-0219161 discloses techniques of managing indexes of the hierarchical structure on a map scale for searching map data and searching indexes through simple calculation.

A conventional navigation system presents a search result, corresponding to a user's query, from among all search data that a product provider provides. Hence, the conventional navigation system has many restrictions and problems to exactly express a result that the user wants.

Data that a product provider provides may be only searched by means of point of interest (POI) search data of existing navigation products. Users may not be provided with information that is separately configured with data of types that they want. Also, because data not required by a user is transmitted, the product provider may provide all their own data, thereby causing unnecessary waste of storage space and a decrease in the quality on a search result due to unwanted results.

If there is provided a system that enables a user to download a hoped-for type of search data, the user may create his/her own search data by only selecting data that the user needs, thereby improving efficiency of the storage space and making it possible to express a search result that the user only wants.

Search is made only when search data must include arranged search index data. Hence, the conventional navigation system cannot help providing the whole data at a time. However, since a time taken to create the lined-up search index data is relatively long, a provider makes corresponding data in advance and provides it to the user.

If the user wants to create a variety of unique search data, the provider must make lined-up search index data on the unique data. However, in a conventional case, because a time taken to create the lined-up search index data is relatively long and the lined-up search index data is various, it is impossible to provide user-set search data.

In addition, a conventional navigation system provides a function of filtering results that are searched depending on administrative zones. However, since search results are restricted to the administrative zones, it is impossible to provide filtering on notional or abstract zones, such as Seorae town, Insadong restaurants, and shopping districts around the Cheonggyecheon.

SUMMARY is the embodiments herein are directed to provide a search data processing system and method capable of setting user-requested search data by creating indexes in real time.

Another embodiment is directed to provide a search data processing system and method capable of minimizing search data for local filtering by creating virtual administrative codes.

One aspect of embodiments herein is directed to provide a search data processing system comprising an index generation unit adapted to generate index data for a search on map-associated data; and a search execution unit adapted to execute a search operation on the map-associated data by means of the index data, wherein a geographical area corresponding to the map-associated data is sectioned into an administrative zone divided by the administration and a semantic zone divided depending on characteristics of locations, wherein the index generation unit adds a local code, assigned to an intersection area where the administrative zone and the semantic zone intersect with each other, to the index data, and wherein local codes are assigned to an intersection area where at least a portion of the administrative zone intersects with the semantic zone and to the remaining area of the administrative zone other than the intersection area, respectively.

In exemplary embodiments, the search data processing system further comprises a loading unit adapted to download map-associated data of a selected item from a map provision unit that provides map-associated data, and the index generation unit generates the index data on the downloaded map-associated data in real time.

In exemplary embodiments, the index generation unit stores and lines up the index data by a unit of a part including a constant number of index data.

In exemplary embodiments, when an item is added to the index data, the index generation unit stores the item to be added at a part including an empty space. If a part including an empty space does not exist, the index generation unit creates a new part and stores the item to be added at the newly created part.

In exemplary embodiments, the local code assigned to the intersection area is used when the relationship of inclusion of a local hierarchical structure on the geographical area is not proper.

In exemplary embodiments, the search execution unit filters the administrative zone or the semantic zone, corresponding to a search query, by means of the local codes when a search operation on the map-associated data is performed.

In exemplary embodiments, the search execution unit searches the administrative zone or the semantic zone and finds a position of a point of interest within the searched zone.

In exemplary embodiments, the search execution unit searches a point of interest to find the administrative zone or the semantic zone to which a position of the point of interest belongs.

Another aspect of embodiments herein is directed to provide a search data processing system comprising a loading unit adapted to download map-associated data of an item selected by a user from a map provision unit that provides map-associated data; an index generation unit adapted to generate index data for a search on the map-associated data; and a search execution unit adapted to execute a search operation on the map-associated data by means of the index data, In exemplary embodiments, the index generation unit stores and lines up the index data by a unit of a part including a constant number of index data.

In exemplary embodiments, when an item is added to the index data, the index generation unit stores the item to be added at a part including an empty space. If a part including an empty space does not exist, the index generation unit creates a new part and stores the item to be added at the newly created part.

In exemplary embodiments, the search data processing system further comprises a sharing processing unit that provides the map-associated data to any other terminal for sharing with the others.

Still another aspect of the embodiments herein is directed to provide a map provision server comprising an interface unit adapted to receive a selected item on map-associated data from a user terminal; and a data provision unit adapted to provide map-associated data of the selected item to the user terminal, wherein the user terminal generates index data for a search on the map-associated data of the selected item A further aspect of the embodiments herein is directed to provide a method of processing search data in a search data processing system for a map search, the search data processing system including an index generation unit and a search execution unit, the method comprising generating, by the index generation unit, index data for a search on map-associated data of an item selected by a user; and executing, by the search execution unit, a search operation on the map-associated data of the selected item by means of the index data.

An aspect of the embodiments herein is directed to provide a method of processing search data in a search data processing system for a map search, the search data processing system including an index generation unit and a search execution unit, the method comprising generating, by the index generation unit, index data for a search on map-associated data of an item selected by a user; and executing, by the search execution unit, a search operation on the map-associated data of the selected item by means of the index data, wherein a geographical area corresponding to the map-associated data is sectioned into an administrative zone divided by the administration and a semantic zone divided depending on characteristics of locations, and wherein in the generating, a local code assigned to an intersection area where the administrative zone and the semantic zone intersect with each other is added to the index data and local codes are assigned to an intersection area where at least a portion of the administrative zone intersects with the semantic zone and to the remaining area of the administrative zone other than the intersection area, respectively.

With the embodiments herein, as index data is generated in real time without using separate database, the user selects map-associated data of an item, which the user wants, and creates his/her own search data, thereby improving efficiency of a storage space and reliability on a search result due to expression of a result the user wants. Also, as index data is created in real time, search data of the user is shared by any other user, or the user directly creates data that is to be used to search. Unlike a conventional case where there is used standardized search data provided by a product provider, a great number of users create a variety of search data, thereby making it possible to provide a new search way capable of guiding participation of the user.

With the embodiments herein, an intersection code may be added when an administrative zone divided by the administration intersects with a semantic zone divided depending on the characteristics of the locations, thereby making it possible to filter the administrative zone and the semantic zone. In addition, codes may be added to an area of an administrative zone intersecting with a semantic zone and the remaining area of the administrative zone other than the intersection area, thereby minimizing search data for local filtering.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

The embodiments herein relate to a technique of searching map information depending on map data and are applied to a variety of location based services (LBSs) including the following: a guide service and a map search service associated with a global positioning system (GPS) and/or a geographical information system (GIS). In particular, the embodiments herein are applicable to a personal navigation system.

Figure 1:
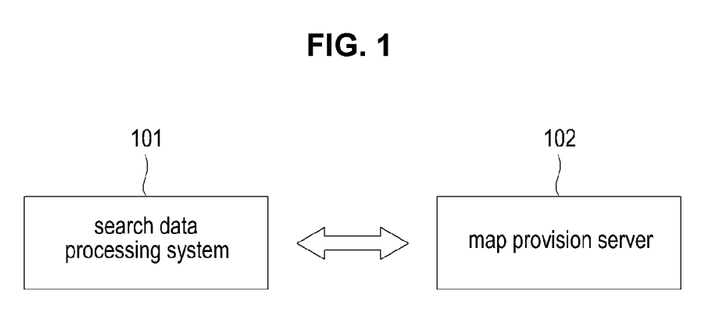
FIG. 1 is a block diagram schematically illustrating a relationship between a search data processing system and a map provision server, according to one embodiment.

FIG. 1 is a block diagram schematically illustrating a relationship between a search data processing system and a map provision server according to one embodiment. FIG. 1 shows a search data processing system 101 and a map provision server 102. In FIG. 1, an arrow means that data is transmitted and received between the search data processing system 101 and the map provision server 102 through wired and wireless communications.

The map provision server 102 is a file database system that stores and retains both geographic data indicating geographic information on a map and map data including information on various points of interest (POI) on the map. The POI may include not only roads, buildings, and facilities existing on a map but also all targets associated with position data not existing but virtually generated or set. Also, the map data may contain various forms of data including the following for expression of the map or information: texts, images, moving pictures, and voices. The map provision server 102 may act as the platform for providing map data to a local device being a client under a PC or mobile environment.

The search data processing system 101 may be implemented at a local device that is a terminal device and is capable of searching a map. The local device may mean all terminal devices capable of accessing the map provision server 102 through the PC web or the mobile web/App: including, but not limited to, a personal computer (PC), laptop computer, navigation terminal, smart phone, tablet, digital multimedia broadcasting (DMB), and portable multimedia player (PMP).

In this specification, the term "map-associated data" may mean map data provided from the map provision server 102. Below, because the map-associated data corresponds to data to be searched, the map-associated data may be referred to as 'search data'.

In exemplary embodiments, in order for a user to directly set search data, the search data processing system 101 is selectively provided with search data corresponding to a user-requested item from the map provision server 102, configures a search index on the provided search data in real time, and utilizes the search index thus configured to search (real-time index creating function). Also, to minimize filtering data at a search operation, the search data processing system 101 utilizes a virtual local code that makes it possible to process both an administrative zone and a semantic zone (notional or abstract zone) where characteristic places exist (local filter function).

Figure 2:
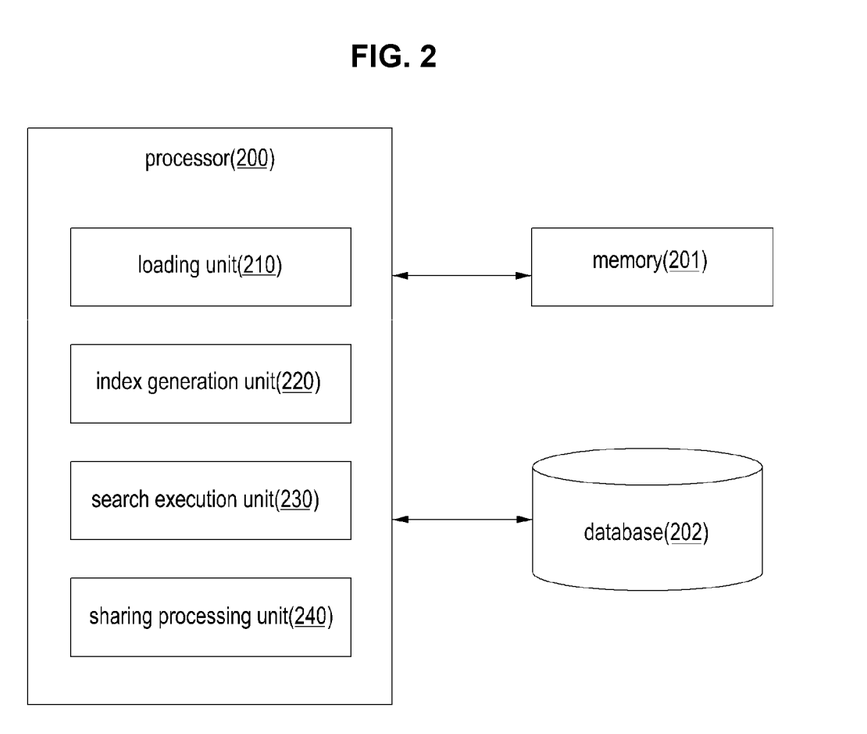
FIG. 2 is a block diagram schematically illustrating a system of processing search data based on indexes generated in real time, according to one embodiment.

FIG. 2 is a block diagram schematically illustrating a system of processing search data based on indexes generated in real time such as the search data processing system 101, according to one embodiment.

As illustrated in FIG. 2, a search data processing system according to one embodiment contains a processor 200, a memory 201, and database 202, and the processor 200 includes a loading unit 210, an index generation unit 220, a search execution unit 230, and a sharing processing unit 240.

The memory 201 stores a program that includes commands for providing all functions of a system including a real-time index generation function and a local filter function. Steps that will be described with reference to FIG. 7 and the search data processing system will execute may be executed by the program stored in the memory 201. For example, the memory 201 may be a hard disk drive, a solid state drive, an SD card, or any other storage medium.

The database 202 acts as storage that stores and retains all information needed to provide all functions of the system including the real-time index generation function and the local filter function. For example, the database 202 may store low scale data and any setup data of a local device, search data provided from a map provision server, a search index on search data, and so on.

The processor 200 operates in response to the commands of the program stored in the memory 201 and includes a microprocessor, such as a central processing unit (CPU). A detailed configuration of the processor 200 is as follows.

In exemplary embodiments, map data, corresponding to an item selected by a user, from among map data provided from the map provision server 102 may be set to search data of the user. For example, the loading unit 210 downloads search data of an item individually selected by the user from the map provision server.

Figure 3:
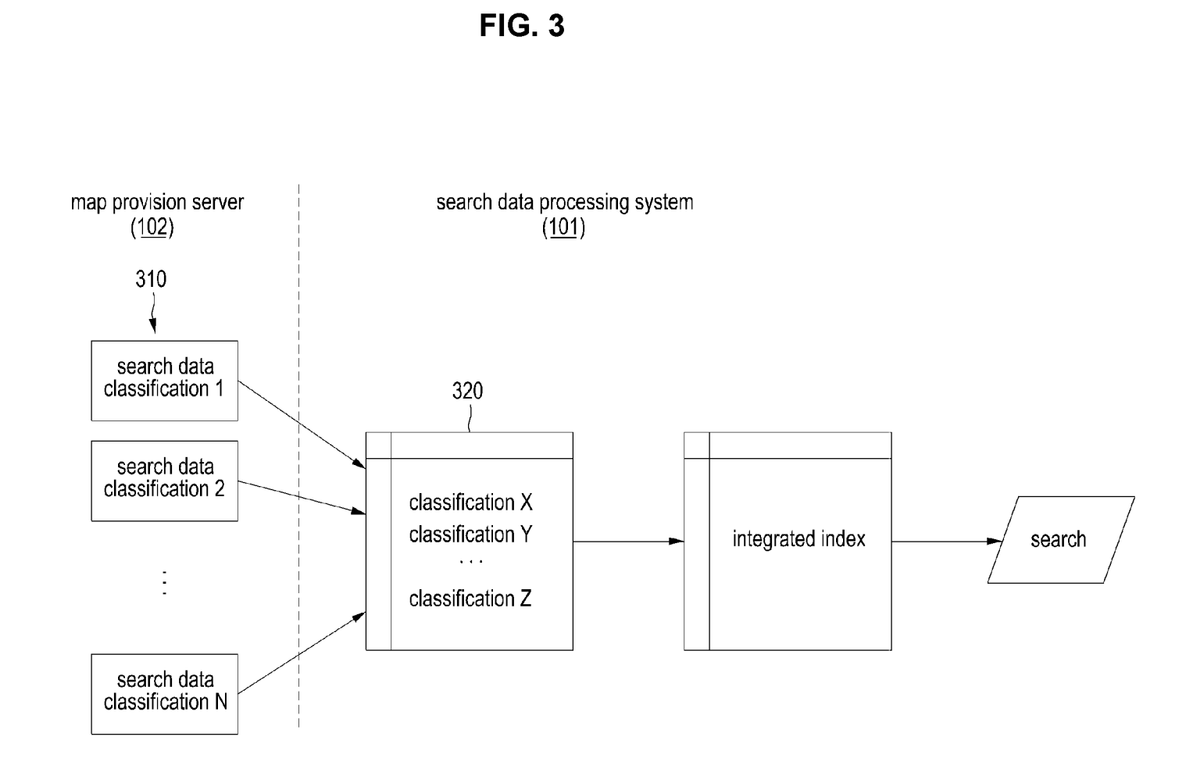
FIG. 3 is a diagram for describing how search data of a user is set according to one embodiment.

Referring to FIG. 3, the map provision server 102 divides search data based on a predetermined reference (e.g., an administration unit) and provides search data 310 (search data classification 1 through search data classification N) corresponding to each item. A local device, the search data processing system 101 downloads search data 320 (classification X, classification Y . . . classification Z) corresponding to each item. That is, the search data processing system 101 downloads search data 320 of a type which the user only wants and stores the downloaded search data 320 in the database 202 for search.

Returning to FIG. 2, the index generation unit 220 generates index data for searching search data of the user in real time. At this time, the index generation unit 220 lines up index data on search data of an item selected by the user, not the whole search data. For example, the index generation unit 220 stores and lines up index data by a unit of a part including a constant number of index data. In other words, the index generation unit 220 groups index data by the part (including a specific number of index data). In exemplary embodiments, search data is lined up within one part and among parts each including a specific number of index data.

For example, when divided by the part (including 100 items), 20,000 items are sectioned into 200 parts each including 100 items. If one item is added under this condition, conventionally, 20,001 items are again lined up. In the embodiments herein, however, if a part where the new item is to be included has an empty space, the new item may be stored at a position lined up in the corresponding part. If a part where the new item is to be included has no empty space, the last one item of the corresponding part may generate an empty new part. At this time, the new item is stored at a first position of the part thus generated. As one part is newly generated, the number of parts is 201 and arrangement is made among 201 parts. At this time, a result of arranging 201 parts may be separately stored. The amount of calculation is as follows: line-up among 100 items in a part and line-up among 201 parts (including 200 parts previously generated and one part newly added). Not added is a part when a part to which a new item is to be added includes an empty space. In this case, arrangement is made only in the part without line-up among parts.

The above-described line-up methodology enables to-be-lined-up items to be reduced by a logarithm unit, which makes it possible to index search data in real time. This means that the user randomly sets search data by means of indexes generated in real time.

When search data is set to provide a local filter function, index data is not generated depending on administrative zones divided by the administration, but a set of virtual local codes are applied with respect to the whole index data with consideration for an intersection area, an area intersecting with a semantic area.

For local filtering, a POI search method that is based on a conventional GIS may express a POI search result of the local filtering by inserting an administration code in POI information and comparing a searched result and the administration code. At this time, the administration code includes city, district, and street address information and rural information, and it is possible to perform filtering by a corresponding unit. Since a conventional method only provides local filtering of an administration unit depending on an administration code, it is impossible to filter an area (i.e., a semantic area) (e.g., Seorae town, Insadong restaurants, and shopping districts around the Cheonggyecheon in Korea) that has the common characteristics of locations at adjacent zones of which the administration codes are different from each other.

Figure 4:
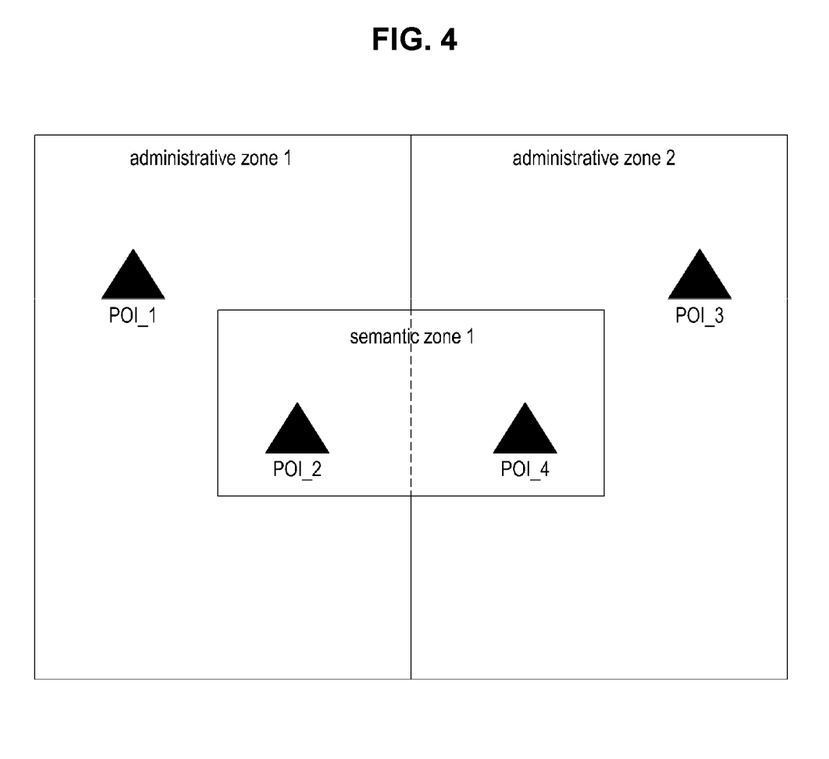
FIG. 4 is a diagram for describing a conventional local code assigning way for local filtering.

As described above, to filter a semantic area, conventionally, a set of codes indicating semantic zones are added to a search index that includes a set of codes indicating administrative zones. As illustrated in FIG. 4, two local codes, that is, a first code indicating an administrative zone 1 and a second code indicating a semantic zone 1 are required to express POI_2 that exists in the semantic zone.

In exemplary embodiments, division is made with all geographical areas to be filtered, and virtual local codes are respectively assigned to sections. Zones to be filtered may be expressed by a sum of virtual local codes.

Figure 5:
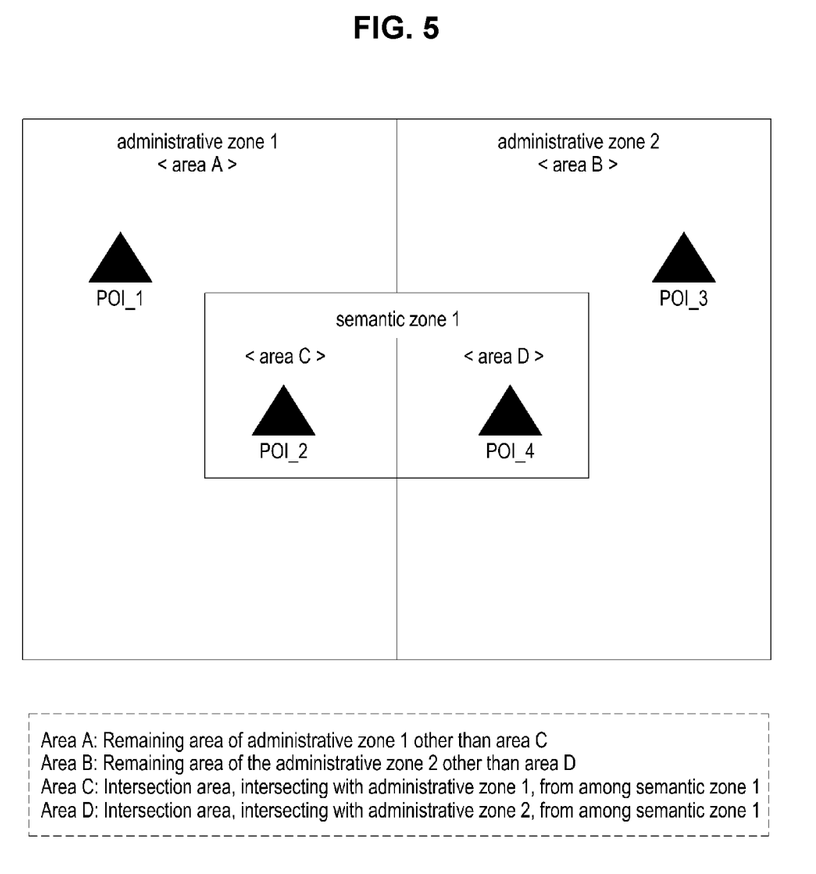
FIG. 5 is a diagram for describing a method of assigning a virtual local code with consideration for an intersection area intersecting with a semantic zone according to one embodiment.

For example, if a semantic zone exists over an administrative zone 1 and an administrative zone 2 as illustrated in FIG. 5, a map provision server 102 divides a corresponding geographical area into an area A (the remaining area of the administrative zone 1 other than an intersection area intersecting with the semantic zone 1), an area B (the remaining area of the administrative zone 1 other than an intersection area intersecting with the semantic zone 1), an area C (an intersection area, intersecting with the administrative zone 1, from among the semantic zone 1), and an area D (an intersection area, intersecting with the administrative zone 2, from among the semantic zone 1). The map provision server 102 assigns virtual local codes to the areas A through D, respectively. In an embodiment shown in FIG. 5, one local code corresponding to the area C is assigned to POI_2 that exists in the semantic zone.

In other words, a geographical area may be classified into administrative zones divided by the administration and semantic zones divided depending on the characteristics of the locations, and the map provision server 102 assigns local codes to administrative zones. In particular, when an administrative zone partially intersects with a semantic zone, local codes are respectively assigned to an intersection area intersecting with the semantic zone and the remaining area of the administrative zone other than the intersection area.

In exemplary embodiments, at least three tables may be stored in the map provision server.

A table 1 may store the following information.

TABLE 1

| Local code | Area information |
| --- | --- |
| Area A | Remaining area of administrative zone 1 other than area C |
| Area B | Remaining area of the administrative zone 2 other than area D |
| Area C | Intersection area, intersecting with administrative zone 1, from among semantic zone 1 |
| Area D | Intersection area, intersecting with administrative zone 2, from among semantic zone 1 |

The table 1 shows definition on points of interest to be searched by a user.

A table 2 may store the following information.

TABLE 2

| Administrative and semantic zones | Local codes included |
| --- | --- |
| Administrative zone 1 | Area A + area C |
| Administrative zone 2 | Area B + area D |
| Semantic zone 1 | Area C + area D |

TABLE 2-continued

| Administrative and semantic zones | Local codes included |
|---|---|

The table 2 informs whether administrative zones divided by the administration and semantic zones divided depending on characteristics of the locations include any intersection areas. The table 2 is used for a search operation when there is used a top-down way where the user searches an administrative zone or a semantic zone to find a position of a point of interest.

A table 3 may store the following information.

TABLE 3

| POI Code | Administrative and semantic zones including POIs |
|---|---|
| Area A | Administrative zone 1 |
| Area B | Administrative zone 2 |
| Area C | Administrative zone 1 + semantic zone 1 |
| Area D | Administrative zone 2 + semantic zone 1 |

The table 3 informs whether a point of interest is included in any administrative and semantic zones when the point of interest is searched by means of a keyword. The table 3 is used for a search operation when there is used a bottom-up way where the user searches the point of interest by means of a keyword to find a position of the point of interest.

Hence, the index generation unit 220 adds a local code, assigned to a geographical area corresponding to search data of a user, to index data. That is, the index generation unit 220 adds a local code to index data on search data of the user with consideration for an intersection area. At this time, if the relationship of inclusion of the local hierarchical structure on a geographical area is not proper, a local code corresponding to the intersection area may be applied to local filtering at a search operation.

Returning to FIG. 2, the search execution unit 230 executes a search operation on search data of the user by means of index data that the index generation unit 220 generates. The user only selects necessary data to create his/her own search data, thereby making it possible for the user to obtain a search result in search data only required by the user.

In particular, when seeking search data of the user, the search execution unit 230 filters an administrative zone or a semantic zone, corresponding to a search query, by means of a local code added to index data. Referring to FIG. 5, codes of the areas A through D are respectively assigned to POI_1 through POI_4. Expressed is a result with a code value of the area A or the area C when the administrative zone 1 is searched. When the administrative zone 2 is searched, there is expressed a result with a code value of the area B or the area D. Expressed is a result with a code value of the area B or the area D when the administrative zone 2 is searched.

Thus, the search execution unit 230 filters both the administrative zone and the semantic zone by means of a set of local codes added to index data.

Also, the search execution unit 230 searches a map in the top-down way or the bottom-up way by means of the tables 1 through 3. In exemplary embodiments, the search execution unit 230 may find a position of a point of interest at a corresponding zone by searching an administrative zone or a semantic zone based on information of the table 2. For example, after searching the administrative zone 2, the user may find a position of a point of interest in the area B or the area D included in the administrative zone 2. As another example, the search execution unit 230 may search an administrative zone or a semantic zone, to which a position of a point of interest belongs, by searching the point of interest based on information of the table 3. For example, the user may find whether a point of interest is included in any administrative zone or semantic zone, by searching the point of interest by means of keywords.

Finally, the sharing processing unit 240 provides search data of the user to any other terminal for sharing with the others. For example, the sharing processing unit 240 allows any other terminal selected by the user to share the search data of the user, and the map provision server 102 provides any other terminal selected by the user with the search data of the user. Thus, the user selects a necessary type of search data and creates his/her own search data by means of the selected result. In addition, the user shares his/her own search data with any other user.

Figure 6:
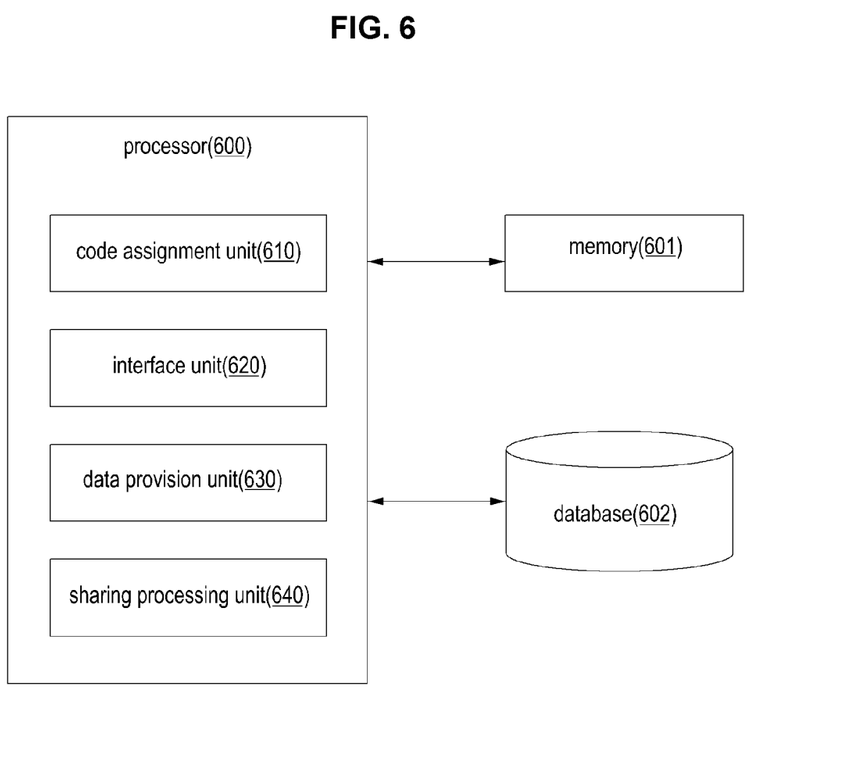
FIG. 6 is a block diagram schematically illustrating a map provision server according to one embodiment.

FIG. 6 is a block diagram schematically illustrating a map provision server 102, according to one embodiment.

As illustrated in FIG. 6, a map provision server 102 according to one embodiment contains a processor 600, a memory 601, and database 602. The processor 600 includes a code assignment unit 610, an interface unit 620, a data provision unit 630, and a sharing processing unit 640.

The memory 601 stores a program that includes commands for providing an overall function of a system associated with a map service. For example, the program may include a command that makes it possible to provide search data of a user-required item together with a local device. For example, the memory 201 may be a hard disk drive, a solid state drive, an SD card, or any other storage medium.

The database 602 functions as a file database for managing search data on the whole map and is used to store and retain all information needed for a service.

The processor 600 operates in response to commands of the program stored in the memory 601 and includes a microprocessor, such as a central processing unit (CPU). A detailed configuration of the processor 600 is as follows.

The code assignment unit 610 makes division with a geographical area on the whole map and then assigns virtual local codes to sections, respectively. A geographical area may be classified into administrative zones divided by the administration and semantic zones divided depending on the characteristics of the locations. Hence, the code assignment unit 610 assigns local codes capable of processing semantic zones as well as administrative zones to minimize filtering data when search data is located. For example, the code assignment unit 610 assigns local codes to administrative zones. In particular, when the administrative zone partially intersects with a semantic zone, local codes are respectively assigned to an intersection area intersecting with the semantic zone and the remaining area of the administrative zone other than the intersection area.

The interface unit 620 receives at least one, selected by the user, from among all items of search data from a user terminal as a local device. The whole search data is divided depending on a predetermined reference (e.g., administrative unit), and it is possible to find search data by the item.

The data provision unit 630 enables a user terminal to download search data of an item, selected by the user terminal, through the interface unit 620. That is, the data provision unit 630 selectively provides search data that the user only wants. Thus, a search data processing system that is implemented on the user terminal generates and organizes a search index on search data, set by the user, in real time for searching.

The sharing processing unit 640 provides search data set by the user to any other terminal for sharing with the others in response to a request of the user terminal. For example, if the user selects any other people (e.g., sharing target) through the user terminal and allows sharing on search data, the sharing processing unit 640 may provide the search data of the user to any other terminal selected by the user.

Figure 7:
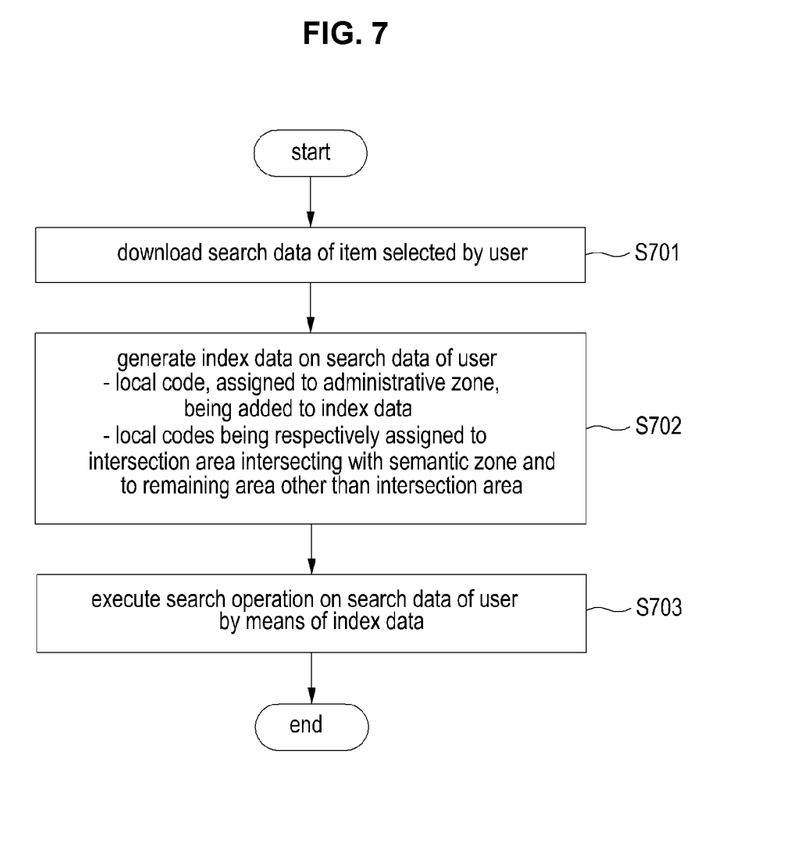
FIG. 7 is a flow chart schematically illustrating a method of processing search data depending on indexes generated in real time according to one embodiment.

FIG. 7 is a flow chart schematically illustrating a method of processing search data depending on indexes generated in real time, according to one embodiment. In the search data processing method, steps will be executed by a search data processing system described with reference to FIGS. 1 through 5.

In step S701, the search data processing system decides map data of an item, selected by a user, as search data of the user. For this, a loading unit 210 of the search data processing system downloads search data of an item, selected by the user, from a map provision server 102 and stores the downloaded search data in the database 202 of the search data processing system.

In step S702, the search data processing system generates index data for a search on the search data of the user in real time. In detail, an index generation unit 220 of the search data processing system lines up index data on the search data, selected by the user, that is, on search data stored in the database 202 of the search data processing system. For example, the index generation unit 220 of the search data processing system may store and line up index data by a unit of a part including a constant number of index data. At this time, when adding an item to index data, the index generation unit 220 of the search data processing system stores the item at a part including an empty space and then makes arrangement in the part. If a part including an empty space does not exist, the index generation unit of the search data processing system creates a new part and then stores the item at the newly created part. Afterwards, the index generation unit 220 of the search data processing system makes arrangement in the part and among parts. Also, the index generation unit 220 of the search data processing system adds, to the index data, a local code on a geographical area corresponding to the search data of the user. At this time, a geographical area may be classified into administrative zones divided by the administration and semantic zones divided depending on the characteristics of the locations. Hence, the map provision server 102 assigns local codes to the administrative zones, respectively. In particular, when the administrative zone partially intersects with a semantic zone, local codes are respectively assigned to an intersection area intersecting with the semantic zone and the remaining area of the administrative zone other than the intersection area. Thus, when adding, to the index data, a local code assigned to a geographical area corresponding to the search data of the user, the index generation unit 220 of the search data processing system may add the local code with consideration for the intersection area. At this time, if the relationship of inclusion of the local hierarchical structure on a geographical area is not proper, a local code corresponding to the intersection area may be applied to a local filtering process at a search operation.

In step S703, the search data processing system seeks search data only selected by the user. A search execution unit 230 of the search data processing system may execute a search operation on the search data of the user by means of the index data generated in step S702. The user only selects necessary data to create his/her own search data, thereby making it possible for the user to obtain a search result in search data only required by the user.

In particular, when finding the search data of the user, the search execution unit 230 of the search data processing system filters an administrative zone or a semantic zone, corresponding to a search query, by means of a local code added to index data. Furthermore, the search execution unit 230 of the search data processing system may provide a top-down search way, in which the user finds a position of a point of interest by searching an administrative zone or a semantic zone, or a bottom-up search way, in which the user searches the point of interest with keywords to find whether a position of the point of interest is included in any administrative and semantic zones.

Operations of the search data processing method may be reduced depending on the detailed contents of the search data processing system described with reference to FIGS. 1 through 5, or the search data processing method may further include operations added depending on the detailed contents of the search data processing system described with reference to FIGS. 1 through 5. Also, two or more operations may be combined, or a change on an order or locations of operations may be variously made.

Methods according to an embodiment of the inventive concept may be implemented in the form of program instructions that a variety of computer systems can execute and then stored at a non-transitory computer-readable medium. For example, a non-transitory computer-readable medium may be provided which stores a program including steps of: downloading map-associated data of an item selected by a user from a map provision server, creating index data for searching the downloaded map-associated data in real time, and performing a search operation on the downloaded map-associated data by means of the index data. As another example, a non-transitory computer-readable medium may be provided which stores a program including steps of: creating index data for searching map-associated data, a local code assigned to an intersection area where an administrative zone intersects with a semantic zone being added to the index data; and performing a search operation on the map-associated data by means of the index data, wherein local codes are assigned to an intersection area where at least a portion of the administrative zone intersects with the semantic zone and to the remaining area of the administrative zone other than the intersection area.

A program according to one embodiment may be implemented by a PC-based program or a dedicated application installed on a mobile terminal. In exemplary embodiments, an application for processing searched data may be implemented in the form of program that operates independently, or it may be implemented in the form of in-app of a specific application such that the application can operate on the specific application.

As described above, as index data is generated in real time without using separate database, the user selects map-associated data of an item, which the user wants, and creates his/her own search data, thereby improving efficiency of a storage space and reliability on a search result due to expression of a result the user wants. Also, as index data is created in real time, search data of the user is shared by any other user, or the user directly creates data that is to be used to search. Unlike a conventional case where there is used standardized search data provided by a product provider, a great number of users create a variety of search data, thereby making it possible to provide a new search way capable of guiding participation of the user. With an embodiment of the inventive concept, an intersection code may be added when an administrative zone divided by the administration intersects with a semantic zone divided depending on the characteristics of the locations, thereby making it possible to filter the administrative zone and the semantic zone. In addition, codes may be added to an area of an administrative zone intersecting with a semantic zone and the remaining area of the administrative zone other than the intersection area, thereby minimizing search data for local filtering.

The units described herein may be implemented using hardware components, software components, or a combination thereof. For example, devices and components described therein may be implemented using one or more general-purpose or special purpose computers, such as, but not limited to, a processor, a controller, an arithmetic logic unit, a digital signal processor, a microcomputer, a field programmable gate array (FPGA), a programmable logic unit, a microprocessor or any other device capable of responding to and executing instructions in a defined manner. A processing device may run an operating system (OS) and one or more software applications that run on the OS. The processing device also may access, store, manipulate, process, and create data in response to execution of the software. For the sake of easy understanding, an embodiment of the inventive concept is exemplified as one processing device is used; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to perform various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A search data processing system comprising:
    a memory comprising computer readable instructions; and
    at least one processor configured to execute the computer readable instructions, the instructions when executed by the processor cause the processor to perform steps comprising:
        receiving a selection of an item from a user;
        downloading map associated search data of the item responsive to the selection of the item from the user;
        generating index data for a search on the map-associated data in real time responsive to downloading the map associated search data; and
        executing a search operation on the map-associated data by means of the index data,
    wherein a geographical area corresponding to the map-associated data is sectioned into an administrative zone divided by administration and a semantic zone divided depending on characteristics of locations,
    wherein generating the index data comprises adding a local code, assigned to an intersection area where the administrative zone and the semantic zone intersect with each other, to the index data, and
    wherein local codes are assigned to an intersection area where at least a portion of the administrative zone intersects with the semantic zone and to the remaining area of the administrative zone other than the intersection area, respectively,
    wherein when the semantic zone intersects with a first administrative zone and a second administrative zone, a first local code is assigned to the remaining area of the first administrative zone other than an intersection area intersecting with the semantic zone, a second local code is assigned to the remaining area of the second administrative zone other than the intersection area intersecting with the semantic zone, a third local code is assigned to an intersection area of the semantic zone intersecting with the first administrative zone, and a fourth local code is assigned to an intersection area of the semantic zone intersecting with the second administrative zone, and
    wherein, as a result of the search operation, a search result with the first local code and the third local code is provided in response to a selection of the item regarding the first administrative zone from the user, a search result with the second local code and the fourth local code is provided in response to a selection of the item regarding the second administrative zone from the user, and a search result with the third local code and the fourth local code is provided in response to a selection of the item regarding the semantic zone from the user.

2. The search data processing system of claim 1, wherein the local code assigned to the intersection area is used when the relationship of inclusion of a local hierarchical structure on the geographical area is not proper.

3. The search data processing system of claim 1, wherein executing the search operation comprises searching the administrative zone or the semantic zone and finds a position of a point of interest within the searched zone.

4. The search data processing system of claim 1, wherein executing the search operation comprises searching a point of interest to find the administrative zone or the semantic zone to which a position of the point of interest belongs.

5. A map provision server comprising:
a memory comprising computer readable instructions; and
at least one processor configured to execute the computer readable instructions, the instructions when executed by the processor cause the processor to perform steps comprising:
receiving a selected item on map-associated data from a user terminal; and
providing non-indexed map-associated data of the selected item to the user terminal,
wherein the user terminal generates in real time index data for a search on the map-associated data of the selected item in response to receiving the non-indexed map-associated data,
wherein a geographical area corresponding to the map-associated data of the selected item is sectioned into an administrative zone divided by administration and a semantic zone divided depending on characteristics of locations,
further comprising:
assigning a local code to an intersection area where the administrative zone and the semantic zone intersects with each other, local codes being assigned to an intersection area where at least a portion of the administrative zone intersects with the semantic zone and to the remaining area of the administrative zone other than the intersection area, respectively, and
wherein the user terminal adds the local code assigned to the administrative zone to the index data and filters the administrative zone or the semantic zone, corresponding to a search query from the user, by means of the local code when a search operation on the map-associated data of the selected item is performed,
wherein when the semantic zone intersects with a first administrative zone and a second administrative zone, a first local code is assigned to the remaining area of the first administrative zone other than an intersection area intersecting with the semantic zone, a second local code is assigned to the remaining area of the second administrative zone other than an intersection area intersecting with the semantic zone, a third local code is assigned to an intersection area of the semantic zone intersecting with the first administrative zone, and a fourth local code is assigned to an intersection area of the semantic zone intersecting with the second administrative zone, and
wherein, as a result of the search operation, a search result with the first local code and the third local code is provided in response to a selection of the item regarding the first administrative zone from the user, a search result with the second local code and the fourth local code is provided in response to a selection of the item regarding the second administrative zone from the user, and a search result with the third local code and the fourth local code is provided in response to a selection of the item regarding the semantic zone from the user.

6. The map provision server of claim 5, further comprising:
providing the map-associated data of the selected item to any other terminal for sharing with the others in response to a request of the user terminal.

7. A method of processing search data in a search data processing system for a map search, the search data processing system including an index generation unit and a search execution unit, the method comprising:
receiving a selection of an item from a user;
downloading map associated search data of the item responsive to the selection of the item from the user;
generating, by the index generation unit, index data for a search on the map-associated data of the item selected by a user in real time responsive to downloading the map associated search data; and
executing, by the search execution unit, a search operation on the map-associated data of the selected item by means of the index data,
wherein a geographical area corresponding to the map-associated data of the selected item is sectioned into an administrative zone divided by the administration and a semantic zone divided depending on characteristics of locations,
wherein in the generating, a local code, assigned to an intersection area where the administrative zone and the semantic zone intersect with each other, is added to the index data and local codes are assigned to an intersection area where at least a portion of the administrative zone intersects with the semantic zone and to the remaining area of the administrative zone other than the intersection area, respectively,
wherein when the semantic zone intersects with a first administrative zone and a second administrative zone, a first local code is assigned to the remaining area of the first administrative zone other than an intersection area intersecting with the semantic zone, a second local code is assigned to the remaining area of the second administrative zone other than an intersection area intersecting with the semantic zone, a third local code is assigned to an intersection area of the semantic zone intersecting with the first administrative zone, and a fourth local code is assigned to an intersection area of the semantic zone intersecting with the second administrative zone, and
wherein, as a result of the search operation, a search result with the first local code and the third local code is provided in response to a selection of the item regarding the first administrative zone from the user, a search result with the second local code and the fourth local code is provided in response to a selection of the item regarding the second administrative zone from the user, and a search result with the third local code and the fourth local code is provided in response to a selection of the item regarding the semantic zone from the user.

8. The method of claim 7, wherein the search data processing system further comprises a sharing processing unit, the method further comprising:
providing, by the sharing processing unit, the map-associated data of the selected item to any other terminal for sharing with the others.

9. The method of claim 7, wherein the local code assigned to the intersection area is used when the relationship of inclusion of a local hierarchical structure on the geographical area is not proper.

10. The method of claim 7, wherein the executing comprises:
searching the administrative zone or the semantic zone to find a position of a point of interest within the searched zone.

11. The method of claim 7, wherein the executing comprises:

searching a point of interest to find the administrative zone or the semantic zone to which a position of the point of interest belongs.

\* \* \* \* \*